United States Patent
Taylor

[15] 3,669,201
[45] June 13, 1972

[54] MOTOR DRIVEN ICE VEHICLE

[72] Inventor: Frederick A. Taylor, 32548 Riverpoint, New Baltimore, Mich. 48047

[22] Filed: May 19, 1970

[21] Appl. No.: 38,791

[52] U.S. Cl. .................................................180/6 R, 115/1 R
[51] Int. Cl. .................................................B62m 27/02
[58] Field of Search..................................180/6; 115/1

[56] References Cited

UNITED STATES PATENTS

| | | | |
|---|---|---|---|
| 950,292 | 2/1910 | Klein | 180/6 |
| 1,193,365 | 8/1916 | Decker | 180/6 |
| 988,343 | 4/1911 | Hirschkorn | 180/6 |
| 3,180,442 | 4/1965 | Pomeroy | 180/6 |
| 3,190,255 | 6/1965 | Olson | 115/1 |

FOREIGN PATENTS OR APPLICATIONS

| | | | |
|---|---|---|---|
| 131,163 | 5/1902 | Germany | 180/6 |

Primary Examiner—Leo Friaglia
Attorney—Allan J. Murray

[57] ABSTRACT

A vehicle body, such as that of a boat, with laterally spaced rearwardly mounted runners, and first pivot means mounting said runners for limited travel about the axis of said pivot, and substantially transverse to the direction of travel, a forward mounted ski or runner with second pivot means mounting said ski or runner, for arcuate travel about the axis of said second pivot means to steer the vehicle: a bracket assembly secured to the rear of the vehicle by and including laterally spaced parallel, opposed channels, a propulsion unit, having a motor and drive wheel mounted upon a frame, said frame carrying spaced, parallel slide members to be received in said channel members to resist lateral or forward and rearward movement of the mounting assembly, but to afford up and down sliding travel in said channels to accomodate the propulsion unit to irregularities in the surface over which the vehicle is driven, with means attached to said frame engageable with further means secured to the rear portion of the boat to establish a limit for the downward travel of said unit.

2 Claims, 13 Drawing Figures

PATENTED JUN 13 1972
3,669,201
SHEET 1 OF 3
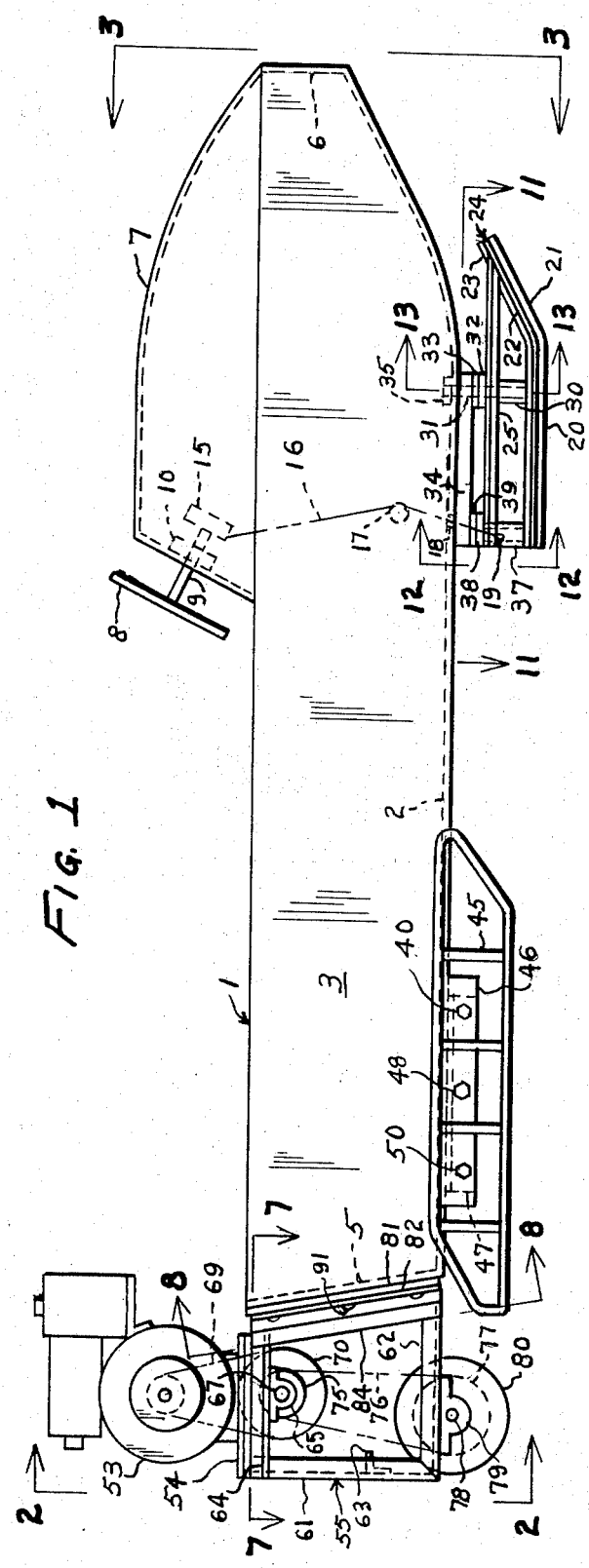
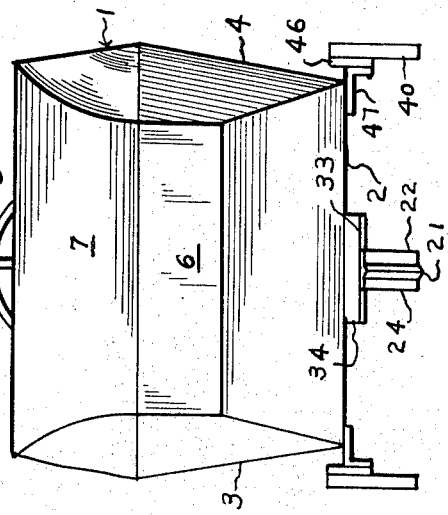
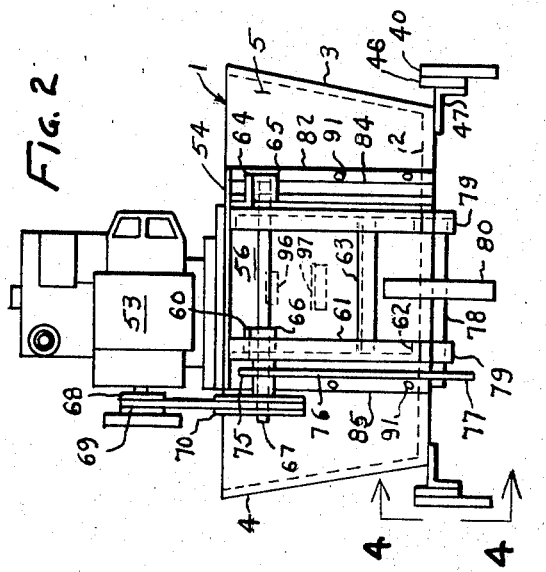
INVENTOR
FREDERICK A. TAYLOR
BY Allan J. Murray
ATTORNEY

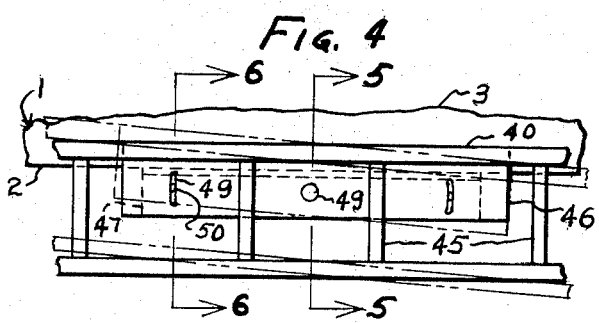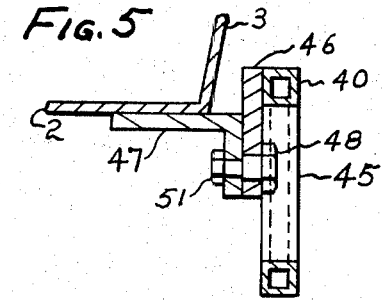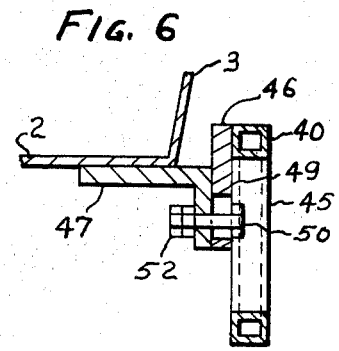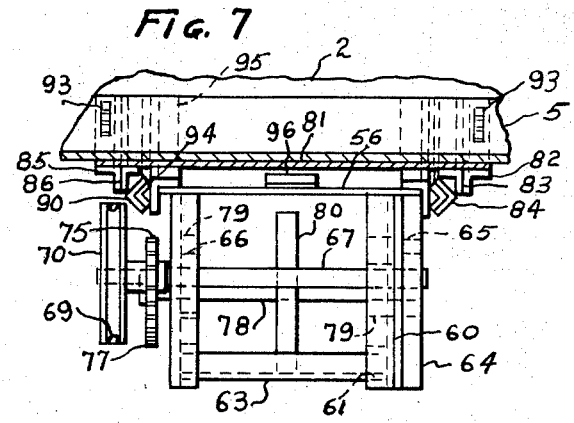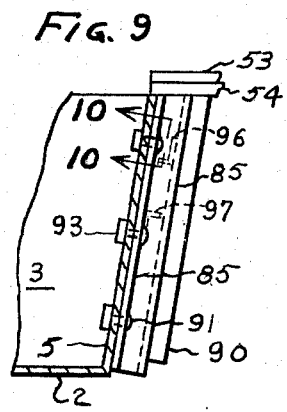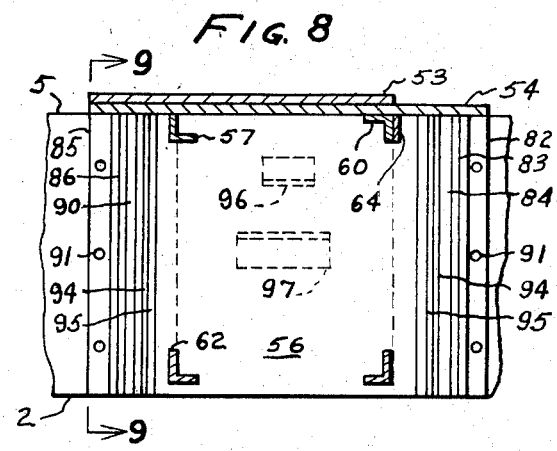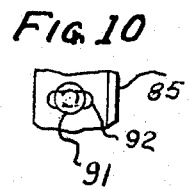

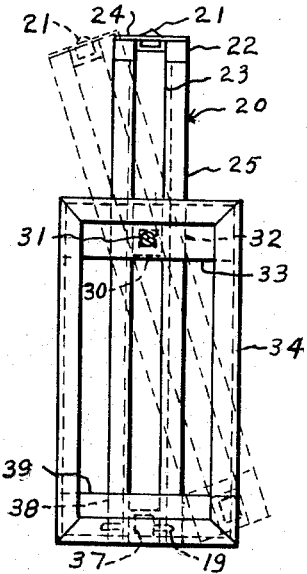
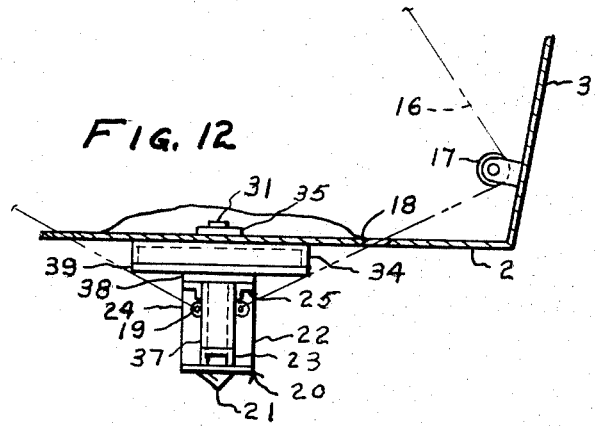
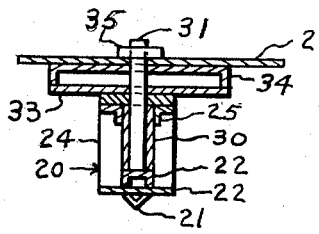

MOTOR DRIVEN ICE VEHICLE

CROSS REFERENCES

There are no currently pending applications by the inventor with respect to this invention.

FIELD OF INVENTION

The invention lies in the provision of a "floating" mount affording up and down sliding travel of the entire propulsion unit and a pivotal mounting of the rearward runners, which in combination accommodate the vehicle to any substantial irregularities in the surface over which the vehicle is traveling, and tends to keep the forwardly mounted steering support means in steering engagement with said surface.

Experience has shown that without the provision of a propulsion unit mounting which affords said up and down travel, there is a very strong tendency of the boat to react by bouncing and leaping when the drive wheel encounters irregularities. A rigidly mounted drive assembly would, of course, carry the rear end of the boat upwardly and downwardly to conform to these irregularities. It has also been determined that with rigidly mounted rear runners, there is a tendency of the forward end of the boat to rise when the rear runners encounter some rough surfaces, which reduces steerability of the boat because the forward support frequently is not in engagement with the ice. This fault is corrected by mounting the rear runners so that they may pivot individually on an approximately horizontal axis transverse to the direction of travel, whereby each rear runner accommodates itself individually to irregularities encountered in the ice surface which reduces any forces toward the front of the boat which would cause the front runner to bounce and lose contact with the ice.

DESCRIPTION OF PRIOR ART

There is enclosed herewith the required disclosure of prior art discovered in the course of a preliminary search, some of which provide for a "floating mount" with reciprocable up and down travel, but none of which discloses an ice vehicle with a rear mounted outboard "floatable" drive with independently pivotal rear runners and an independent forward steering runner. It is believed that invention resides in the provision of a readily detachable mounting bracket to be secured to the rear end of the vehicle body and the readily removable propulsion unit receivable in said mounting bracket for said reciprocable up and down travel therein, and that further, invention lies in the combination of said "floating" drive with the independently pivotally mounted rearward runners.

An object of the invention is to provide a readily removable approximately vertically reciprocable propulsion unit to reduce the vehicle reaction to irregularities in the surface traveled upon, and to provide independent suspension for laterally spaced rear runners, which further contribute to reducing reaction of the vehicle body to the surface over which the body travels.

This and various other objects are attained by the invention hereinafter disclosed and illustrated in the accompanying drawings, wherein:

FIG. 1 is a side elevational view of a boat utilizing the pivotal runner mounting and the slidably reciprocable drive assembly mounting.

FIG. 2 is a rear elevational view taken in the direction of line 2—2 of FIG. 1.

FIG. 3 is a front elevational view taken in the direction of line 3—3 of FIG. 1.

FIG. 4 is a view on a larger scale of a pivotally mounted rear runner taken in the direction of line 4—4 of FIG. 2.

FIG. 5 is a view on a still larger scale taken in the direction of line 5—5 of FIG. 4 to illustrate the pivotal mounting of the said runner.

FIG. 6 is a view on a larger scale taken in the direction of line 6—6 of FIG. 4 to illustrate a bolt and arcuate slot arrangement which affords pivotal travel about the axis of said pivot.

FIG. 7 is a partial horizontal sectional view taken in the direction of line 7—7 of FIG. 1 to illustrate the slidable drive assembly mounting.

FIG. 8 is an approximately vertical, sectional, partial view to further illustrate said slidable mounting taken in the direction of line 8—8 of FIG. 1.

FIG. 9 is a vertical, partial, sectional view taken in the direction of line 9—9 of FIG. 8 and still further illustrating said slidable drive assembly mounting.

FIG. 10 is a partial, vertical, elevational view taken in the direction of line 10—10 of FIG. 9 to illustrate an adjustment slot, the purpose of which is further explained hereinafter.

FIG. 11 is a horizontal, partial sectional view taken in the direction of line 11—11 of FIG. 1 to illustrate the construction of the forward mounted steering ski.

FIG. 12 is a partial, vertical, sectional view taken in the direction of line 12—12 of FIG. 1 to further illustrate said steering ski as well as a cable and pulley steering control.

FIG. 13 is a partial, sectional, elevational view taken in the direction of line 13—13 of FIG. 1 further illustrating the pivotal mounting of said steering ski.

HULL AND STEERING APPARATUS

In these views reference numeral 1 designates generally a vehicle body, which may be adapted from a conventional boat hull. As illustrated, said vehicle body has a bottom wall 2, a side wall 3, and an opposite side wall 4, a rear wall 5, and a front wall 6. A deck 7 may be provided, and with steering apparatus of a type to be disclosed, it is desirable to have a steering wheel 8, terminally mounted upon a steering column 9 which journals in a bearing 10 and at its lower end carries a pulley member 15. A cable 16 is secured to the member 15 in a conventional manner and extends therefrom through pulleys 17, as shown in FIGS. 2 and 13. Holes 18 may be formed in the bottom wall 2, and may further be provided, with nylon or other bearing surfaces against which the cable may engage with a minimum of friction. Beneath the boat, the cable is terminally engaged at each side in an eye 19 mounted on the front ski assembly, which is designated generally as 20.

The forward ski, or runner, is formed with an elongated inverted angle iron 21 which provides a runner-like surface for travel upon ice. A ski member 22 of elongated sheet material is sandwiched between the inverted angle iron 21, and an elongated channel member 23, and the assembly is secured together in a conventional manner, such as welding. It may be seen that the front member will function either as a ski or as a runner, depending on surface conditions.

The forward portion of the front steering unit is appropriately, upwardly bent as indicated at 24. A pair of elongated, parallel, laterally spaced braces is provided, being welded at their forward ends to members 22, 23. Intermediate of the length of said braces, and of said ski assembly, is secured a square tube, which is welded at its respective ends to the braces 25 and the channel member 23. A steering post 31 is inserted into the square tubing, and preferably welded at the upper opening of said tube for movement with said tube and with the entire ski assembly.

The steering post extends upwardly through a slide plate 32 which is allowed rotative movement beneath a cross strap 33. Said strap is welded beneath a frame 34 which may be secured to the bottom wall of the hull 2 in any conventional manner, such as by nuts and bolts (not shown). The steering post 31 extends upwardly through said mounting bracket and through the bottom wall of the boat to receive a locking collar 35 which may be secured to the upper end portion of the steering post as by means of a set screw (not shown).

At the rear end portion of the ski a second piece of square tubing is welded at its lower end to the top of the channel 23 and at its upper end between the two braces 25. A slide plate 38 is secured to the aforesaid braces 25 and the upper end of the square tubing 37, and is afforded sliding travel beneath a cross plate 38 secured beneath the rearward end of the aforesaid bracket 34. The aforesaid eyelets 19 are secured to the walls of the tubing 37, and it will now be seen that the rotation of the steering wheel will wind the cable upon the member 15 and pull the rearward end of the ski in rotative steering travel about the axis of the steering post 31.

PIVOTALLY MOUNTED REAR RUNNERS

On either side of the vehicle, at the rearward end portion thereof, is disposed a runner 40 to which rigidity is imparted by a plurality of struts 45. Said runners are secured, as by welding, to elongated side plates 46. A suspension means is afforded by angle bars 47 which may be secured to the bottom wall of the vehicle body in any convenient manner. A pivot means, such as a shoulder screw 48, secures the runner assembly to the angle suspension means, for pivotal action about the axis of said shoulder screw. Spaced forwardly and rearwardly from said axis are arcuate slots 49 formed in the side plates 46 and receiving threaded studs 50. The inner end portions of the studs are secured by nuts 52 to afford arcuate travel of said side plate within limits prescribed by the ends of the arcuate slots 49. A nut 51 may be used to resist withdrawal of the pivot element 48.

PROPULSION UNIT

An outboard engine or the like 53 is mounted to a top assembly plate 54 as by screws or bolts (not shown). Said top plate rigidly surmounts a frame which may be constructed by welding and is designated generally by reference character 55. Said frame includes an assembly plate 56 to which are secured a pair of parallel upper angle irons 57 and 60, a pair of rearwardly disposed parallel vertical angle irons 61, and a pair of horizontally disposed bottom angle irons 62. It may be desirable to add rigidity to the structure by the provision of a cross brace 63. A mount 64 may be further provided for an inverted journal block 65, which is mounted in alignment with a second bearing block or journalling block 66 to rotatively receive an intermediate shaft 67.

The motor may be of conventional form and commercially available, and need not be described in detail. However, the power output shaft of the motor is provided with a pulley 68 which drives a belt 69 received on a pulley 70 terminally mounted on said intermediate shaft. Inwardly of the pulley 70 is mounted an upper chain sprocket 75 upon which is carried a chain 76 which also engages around a lower chain sprocket 77 mounted upon a driven shaft 78. Journal member 79 are disposed in inverted positions beneath the bottom angle member 62 of the frame to receive the shaft 78. Appropriately disposed on the central portion of the shaft is a drive wheel 80 which may have any desired type of surface-engaging protuberances, such as spikes, in its periphery to facilitate driving the vehicle in travel.

A mounting plate 81 is secured, as hereinafter explained, to the outer surface of the rear wall 5 of the boat. At the right, as seen in FIGS. 2, 7, and 8, two abutted angle irons 82 and 83, and secured as by welding to the angle iron 83, is a slideway angle iron 84. On the left of the aforesaid FIGS. is another pair of abutting angle irons 85 and 86 provided with a slideway angle iron 90 secured as by welding to the angle iron 16.

As may be most clearly seen in FIGS. 7, 8, 9, and 10, the angle irons 82 and 85, which are secured to their respective abutting angle irons as by welding, are themselves secured to the rear wall, or transom 5 of the boat by means of bolts 91 which pass through both the said angle irons 82 and 85 and the mounting plate 81. It is preferred to form slots 92 at the left of the said FIGS. to facilitate placing of the bolts on the left side, said slot being particularly well illustrated in FIG. 10. The bolts are provided interiorly of said rear wall 5 by nuts 93 to resist withdrawal of said bolts from said transom.

Mating, sliding angle irons 94 and 95 are appropriately spaced upon and secured to the assembly plate 56, and, of course, appropriate lubrication is provided to afford the sliding of the rigidly spaced and mounted angle irons 94, 95 in the slideway angle irons 84 and 90 to afford the earlier mentioned up and down sliding travel of the propulsion unit.

In the event that the propulsion unit might break through ice in any unanticipated weak spot, it is desired to put stop elements to limit the descent of the propulsion unit so that it would not be lost through the ice. This is preferably accomplished by mounting an angle iron 96 on said propulsion assembly, and specifically on plate 56 and to mount a cooperating angle iron 97 on the mounting plate 81 so that the protruding flanges of the respective angle irons would engage in the event the propulsion unit should drop farther than is normally desirable.

From the foregoing, it may be seen that the propulsion unit, upon the drive wheel encountering surface irregularities may slide in up and down travel, thus averting reaction of the entire vehicle to such irregularities. Further reaction is avoided by the pivotal mounting of the rear runners.

What I claim is:

1. The combination with a vehicle body having a front end portion and a rear end portion, of means secured to said body to elevate said body for travel over a surface, including a pair of laterally spaced runners at the rearward end portion of said vehicle, and means mounting said runners for limited rocking travel about an axis substantially parallel to the surface traveled upon during vehicle travel, and transverse to the direction of vehicle travel, and means to establish limits to said rocking travel, a first mounting means secured to the rear portion of the vehicle body to receive a propulsion unit, said unit including, a power source, a surface engaging drive wheel, means transmitting a drive from the power source to the drive wheel, and a second mounting means carried by said drive assembly and engageable with said first mounting means to mount said propulsion unit upon said vehicle body.

2. In a combination as set forth in claim 1, said means elevating said body further including a front support disposed at the forward end portion of the vehicle body, and pivot means pivotally securing said front support to the body for movement about the axis of said pivot to steer the vehicle in travel.

* * * * *